March 22, 1927.

W. A. DAWSON 1,621,712

VALVE MECHANISM

Filed July 28, 1925    2 Sheets-Sheet 1

Witness:
R. E. Hamilton

INVENTOR.
William A. Dawson
BY Warren W. House
His ATTORNEY.

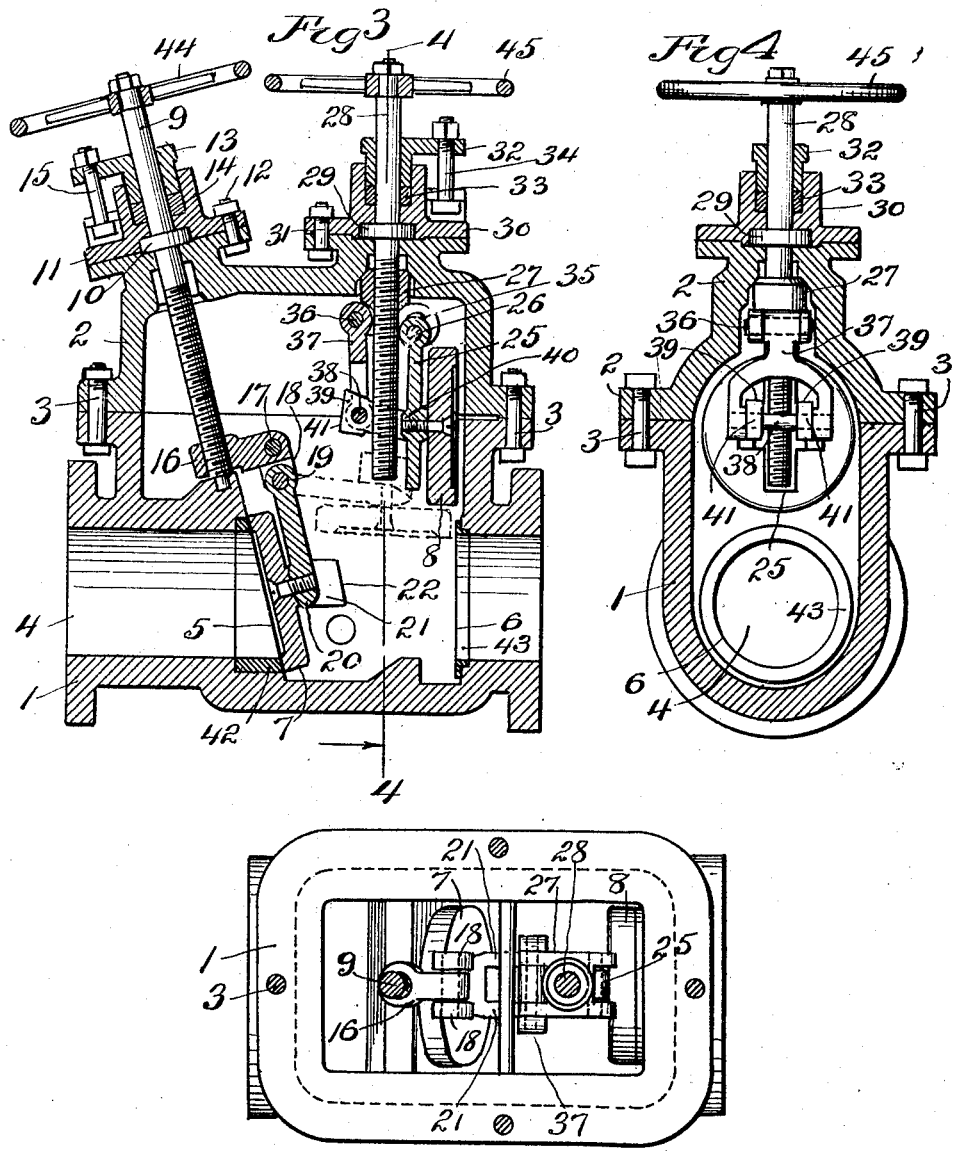

Patented Mar. 22, 1927.

1,621,712

UNITED STATES PATENT OFFICE.

WILLIAM A. DAWSON, OF KANSAS CITY, MISSOURI.

VALVE MECHANISM.

Application filed July 28, 1925. Serial No. 46,521.

My invention relates to improvements in valve mechanisms.

It is particularly adapted for use in connection with gate valve mechanisms used in pipe line systems, in which it is desired to have means for automatically closing the line against return flow in case of breakage, and in which the valve may be moved to a position out of alinement with the port it closes, to enable the cleaning out of the line with the use of a scraper.

One of the objects of my invention is to provide a novel valve mechanism of the kind described, which is simple, cheap, not liable to get out of order, is durable, which can be readily operated to clear the line for cleaning, which will effect a closing of the line in case of breakage, and which is reliable in operation.

A further object of my invention is the provision of a novel valve mechanism which includes two valves for respectively closing two ports, which has novel means for independently operating the valves, and which is provided with novel means by which the valves are connected and wedged to their seats in the closed position.

The novel features of my invention are hereinafter fully described and claimed.

In the accompanying drawings, which illustrate the preferred embodiment of my invention, Fig. 1 is a side elevation of part of a pipe line which includes two valve mechanisms embodying my invention, a break in the pipe line between the valve mechanisms being shown.

Fig. 3 is a longitudinal vertical sectional view of my improved valve mechanism, the check valve being shown in solid lines in the closed position and in dotted lines in the open position, the other valve being shown in the open position.

Fig. 4 is a cross section on the line 4—4 of Fig. 3.

Fig. 5 is a section on the line 5—5 of Fig. 2.

Similar reference characters designate similar parts in the different views.

Figure 1:
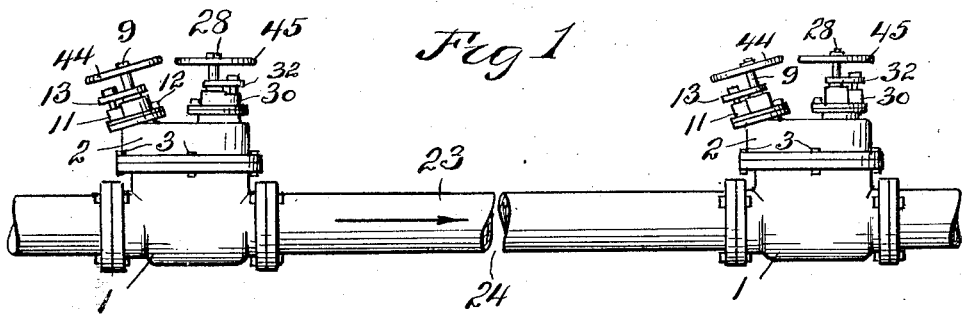

The valve casing may comprise a lower member 1 and an upper member 2 fastened together by bolts 3.

The member 1 has therethrough a horizontal passage 4 having two alined ports 5 and 6 adapted to be respectively closed by two valves 7 and 8.

Manually operated means is provided by which the valves 7 and 8 may be independently opened and closed.

The means for manually operating the valve 7 may comprise the following described parts.

9 designates an inclined screw the lower end of which is rotatable in the member 1, and which extends through and is rotatable in the member 2. The screw 9 has an annular flange 10 which rests on the member 2 and which has its upper side engaged with a stuffing box 11 through which the screw 9 extends and which is fastened by bolts 12 to the member 2. A packing collar 13 encircles the screw 9 and enters the box 11 and bears on packing 14 in said box, the collar 13 being fastened to the box 11 by a bolt 15.

A nut 16 is fitted on the screw 9, and has pivoted to it by a bolt 17 two links 18, which are pivoted by a bolt 19 to an arm 20 provided on the valve 7 and having two extensions 21 having inclined wedge faces or edges 22, which incline upwardly and to the left, as viewed in Fig. 3.

Figure 2:
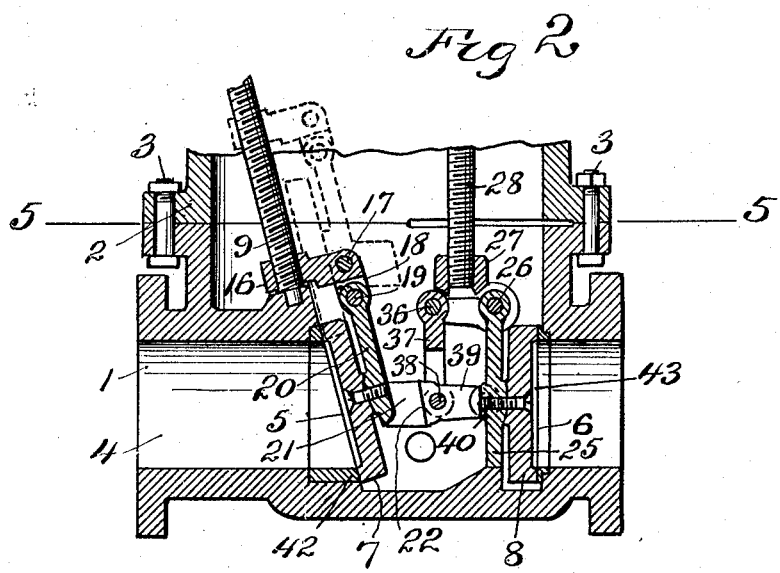
Fig. 2 is an enlarged longitudinal vertical sectional view of a portion of one of my improved valve mechanisms, in which both valves are shown closed and wedged against their seats, the open position of one of the valves being shown in dotted lines.

By turning the screw 9 in the proper direction the valve 7 may be drawn to the open position shown in dotted lines in Fig. 2. When the flow in the pipe line 23, in which the valve casing is located, is in the direction indicated by the arrow in Fig. 1, the valve 7 will be swung to the open position shown in dotted lines in Fig. 3, when the nut 16 is in the closed position shown in Fig. 3. If a break occurs in the line 23, as indicated at 24 in Fig. 1, the pressure in the pipe line at the right of the valve 7, together with gravity, will cause the valve 7 to swing to the closed position shown in solid lines in Fig. 3.

In order that the flow in either direction in the pipe line 23 may be stopped, the valve 8 is provided. This valve has an arm 25 which is pivoted by a bolt 26 to a nut 27 fitted on a screw 28, which extends through the member 2 and is rotatable therein, and which has an annular flange 29 which bears against the member 2, the upper side of the flange engaging a packing box 30 fastened by a bolt 31 to the member 2. A packing collar 32 is on the screw 28 and is fitted in the packing box 30 and bears on packing 33 in said box, and is fastened to the box by a bolt 34. The bolt 26 is mounted in a vertical slot 35 in the nut 27, Fig. 3, so that the bolt is adapted for vertical bodily movement therein.

Pivoted by a bolt 36 to the nut 27 is a yoke 37, the two arms of which are pivoted by a cross pin 38 to two links 39, which are pivoted by a cross pin 40 to the arm 25. The links 39 at their left edges, Fig. 3 and Fig. 5 have plane faces 41 adapted to engage the wedge faces 22 of the extensions 21 on the arm 20, when the valves 7 and 8 are in the closed position, Fig. 2, for wedging the valves against their respective seats 42 and 43, which encircle the ports 5 and 6.

The screws 9 and 28 have respectively fastened to their upper outer ends hand wheels 44 and 45 by which the screws may be manually turned to open and close the valves 7 and 8.

In the normal operation of the invention, the screws 9 and 28 are turned so as to move the nuts 16 and 27 to the positions shown in Fig. 3, in which the valve 8 will be lifted out of alinement with the port 6, and the valve 7 will be in the closed position shown in solid lines in Fig. 3 until the flow passes through the pipe line 23 in the direction indicated by the arrow in Fig. 1, after which the valve 7 will be automatically swung by the flow to the position shown in dotted lines in Fig. 3, in which position it will be out of alinement with the port 5.

In case a break occurs to the left of the valve 7, the latter will automatically swing to the closed position shown in solid lines in Fig. 3. At such time, the hand wheel 45 may be turned to move the valve 8 downwardly to the closed position shown in Fig. 2. As the nut 27, operated by the screw 28, moves downwardly, the arm 25 will have its lower end strike the member 1, when the valve 8 is in alinement with the port 6. Continued downward movement of the nut 27 will move the yoke 37 downwardly until the faces 41 contact and wedge with the faces 22, thereby tightly wedging the valves 7 and 8 against their respective seats 42 and 43. Such continued downward movement of the nut 27 is permitted by the bolt 26 sliding upwardly in the slot 35, after the arm 25 strikes the casing member 1.

When it is desired to clean the pipe line 23, the hand wheel 45 is operated to lift the valve 8 to the position shown in Fig. 3, and the hand wheel 44 is operated to lift the valve 7 to the position shown in dotted lines in Fig. 2. Both valves 7 and 8 will now be out of alinement with their respective ports, which aline with each other, and a scraper may be passed through the passage 4 and ports 5 and 6 to clean them. The hand wheel 44 may then be turned to replace the valve 7 in the position shown in solid lines in Fig. 3, following which the flow through the pipe line may be again begun.

If it is desired to shut off the flow, the hand wheel 45 is turned to set the valve 8 in the closed position shown in Fig. 2.

I do not limit my invention to the structure shown and described, as many modifications, within the scope of the appended claims, may be made without departing from the spirit of my invention.

What I claim is:—

1. In a valve mechanism, a casing having two valve ports, two valves for respectively closing said ports, manually operated means for independently opening and closing said valves, and wedging means connecting said valves in the closed position and holding them seated.

2. In a valve mechanism, a casing having two valve ports, two manually turned screws rotatably mounted in said casing, two nuts respectively fitted and adapted for travel on said screws, two valves for respectively closing said ports, means for supporting one of said valves on one of said nuts, means for supporting the other valve on the other of said nuts, and wedging means connecting said valves in their closed positions and holding them seated.

3. In a valve mechanism, a casing having two ports, two valves for respectively closing said ports, manually operated means for independently opening and closing said valves arranged to move said valves to the open position respectively out of alinement with said ports, and wedging means arranged to connect said valves and hold them seated in the closed position.

4. In a valve mechanism, a casing having two ports, two valves for respectively closing said ports, two independently manually operable means for respectively moving said valves to and from the closed position, one of said valves being automatically movable to the open position, and wedging means arranged to connect said valves in the closed position and hold them seated.

5. In a valve mechanism, a valve casing having two ports, two manually turned screws rotatably mounted in said casing, two nuts adapted for travel on said screws to and from the closed position, two valves for respectively closing said ports, means for supporting one of said valves on one of said nuts, and means for pivotally supporting the other valve on the other of said nuts, whereby the last named valve may automatically swing thereon to and from the closed position.

6. In a valve mechanism, a valve casing having two ports, two manually turned screws rotatably mounted in said casing, two nuts fitted and adapted for travel on said screws respectively to and from the closed position, means for supporting one of said valves on one of said nuts, means for pivotally supporting the other valve on the other of said nuts, whereby the last named valve may automatically swing to and from the closed position, and wedging means arranged to connect said valves in the closed position and hold them seated.

In testimony whereof I have signed my name to this specification.

WILLIAM A. DAWSON.